US009171668B2

(12) United States Patent
Yoshida

(10) Patent No.: US 9,171,668 B2
(45) Date of Patent: Oct. 27, 2015

(54) MAGNET MEMBER

(75) Inventor: Kenichi Yoshida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 13/410,775

(22) Filed: Mar. 2, 2012

(65) Prior Publication Data

US 2012/0242439 A1 Sep. 27, 2012

(30) Foreign Application Priority Data

Mar. 25, 2011 (JP) ................................ 2011-067856

(51) Int. Cl.

| | |
|---|---|
| ***B32B 15/04*** | (2006.01) |
| ***H01F 41/02*** | (2006.01) |
| ***H01F 7/02*** | (2006.01) |
| *H01F 41/26* | (2006.01) |
| *H01F 1/057* | (2006.01) |

(52) U.S. Cl.

CPC ............ *H01F 41/026* (2013.01); *H01F 7/0221* (2013.01); *H01F 1/0577* (2013.01); *H01F 41/26* (2013.01); *Y10T 428/325* (2015.01)

(58) Field of Classification Search

None

See application file for complete search history.

(56) References Cited

U.S. PATENT DOCUMENTS

| | | | | |
|---|---|---|---|---|
| 5,275,891 | A | 1/1994 | Tagaya et al. | |
| 5,435,859 | A * | 7/1995 | Torii et al. | 148/103 |
| 7,859,140 | B2 * | 12/2010 | Sakamoto et al. | 310/12.16 |
| 2004/0188267 | A1 * | 9/2004 | Sakamoto et al. | 205/181 |
| 2008/0053573 | A1 * | 3/2008 | Sakamoto et al. | 148/301 |

FOREIGN PATENT DOCUMENTS

| | | |
|---|---|---|
| JP | A-04-287302 | 10/1992 |
| JP | A-05-198414 | 8/1993 |
| JP | A-08-325677 | 12/1996 |
| JP | A-2003-73888 | 3/2003 |

OTHER PUBLICATIONS

Jun. 24, 2014 Office Action issued in Japanese Patent Application No. 2011-067856 (with translation).

* cited by examiner

*Primary Examiner* — Holly Rickman
*Assistant Examiner* — Lisa Chau
(74) *Attorney, Agent, or Firm* — Oliff PLC

(57) ABSTRACT

A magnet member excellent in both corrosion resistance and adhesion is provided. The magnet member 30 in accordance with the present invention is a magnet member comprising a magnet base body 32 including a rare-earth magnet and a plating film 34 containing Ni and covering the magnet base body 32, while the plating film 34 has a sulfur content lower in a marginal part 38 in a surface S of the magnet base body having an easy magnetization direction M of the magnet base body 32 as a perpendicular thereto than in a center part 36 of the surface S.

5 Claims, 4 Drawing Sheets

MAGNET MEMBER

BACKGROUND OF THE INVENTION

1. Field of the Invention

The present invention relates to a magnet member.

2. Related Background Art

R-T-B-based rare-earth permanent magnets have currently been in use in various fields such as motors because of their high magnetic characteristics. However, the R-T-B-based rare-earth permanent magnets have relatively low corrosion resistance, since they contain as main ingredients a rare-earth element R and a transition metal element T such as iron which are easy to oxidize. When a magnet corrodes, its magnetic characteristics deteriorate and fluctuate. When an R-T-B-based rare-earth permanent magnet is secured to a metal component (yoke) of a motor through an adhesive, a corrosion product such as rust may occur in a contact part between the magnet and the metal component. The corrosion product lowers the adhesion force. For eliminating these problems, a method forming an Ni plating film or Ni alloy plating film as a protective film having excellent corrosion resistance on a surface of the R-T-B-based rare-earth permanent magnet has been employed widely.

When incorporating an R-T-B-based rare-earth permanent magnet equipped with an Ni plating film as a protective layer into a component, high adhesion is required through an adhesive between the Ni plating film and the component. However, the Ni plating film may fail to adhere fully to the component depending on the environment for use. For overcoming this problem, Japanese Patent Application Laid-Open No. 5-198414 proposes a method covering an R-T-B-based rare-earth permanent magnet with an Ni plating film and further forming a chromate coating film on the Ni plating film.

SUMMARY OF THE INVENTION

However, the method disclosed in Japanese Patent Application Laid-Open No. 5-198414 requires a new step for forming a layer of another coating on the surface of the Ni plating film, which may complicate the manufacturing process and raise the cost therefor. Thus layered coating may be denatured and eluted under a highly humid environment in particular, thereby adversely affecting other components. Further, harmful chromium must be used.

In view of the above, it is an object of the present invention to provide a magnet member which is excellent in both corrosion resistance and adhesion.

The magnet member in accordance with the present invention is a magnet member comprising a magnet base body including a rare-earth magnet and a plating film containing Ni and covering the magnet base body, wherein the plating film has a sulfur content lower in a marginal part in a surface of the magnet base body having an easy magnetization direction of the magnet base body as a perpendicular thereto than in a center part of the surface.

The magnet member in accordance with the present invention can attain excellent corrosion resistance and adhesion at the same time under a highly humid environment without providing another film on the surface of the plating film containing Ni.

Preferably, in the present invention, the sulfur content in the plating film in the marginal part is 0.80 to 0.95 times that in the center part. This makes it easier to improve the corrosion resistance and adhesion of the magnet member.

Preferably, in the present invention, the plating film is formed by electroplating. This makes it easier to obtain the magnet member in which the sulfur content in the plating film is lower in the marginal part than in the center part in the surface.

Advantageous Effects of Invention

The present invention provides a magnet member which is excellent in both corrosion resistance and adhesion.

DESCRIPTION OF THE PREFERRED EMBODIMENTS

In the following, preferred embodiments of the present invention will be explained in detail with reference to the drawings. However, the present invention is not limited to the following embodiments.

Magnet Member

Figure 1:
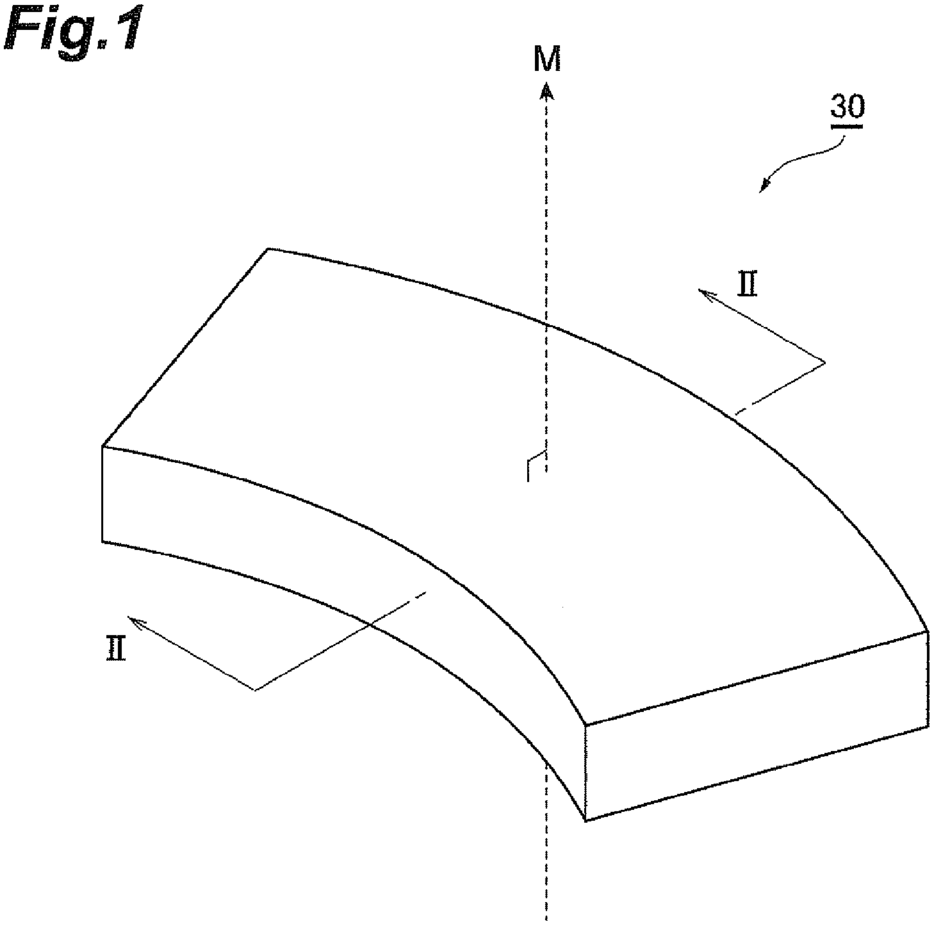
FIG. 1 is a perspective view of the magnet member in accordance with an embodiment of the present invention.
Figure 2:
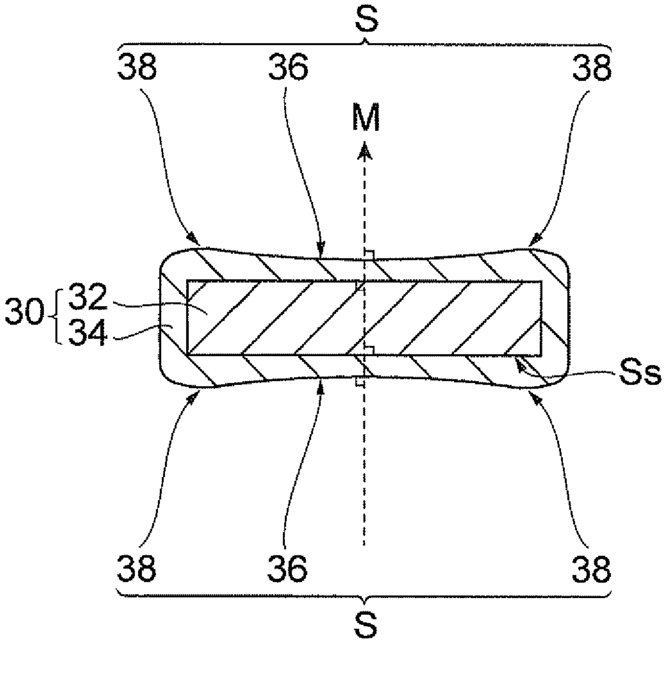
FIG. 2 is a schematic sectional view of the magnet member in accordance with the embodiment taken parallel to an easy magnetization direction of its magnet base body.
Figure 3:
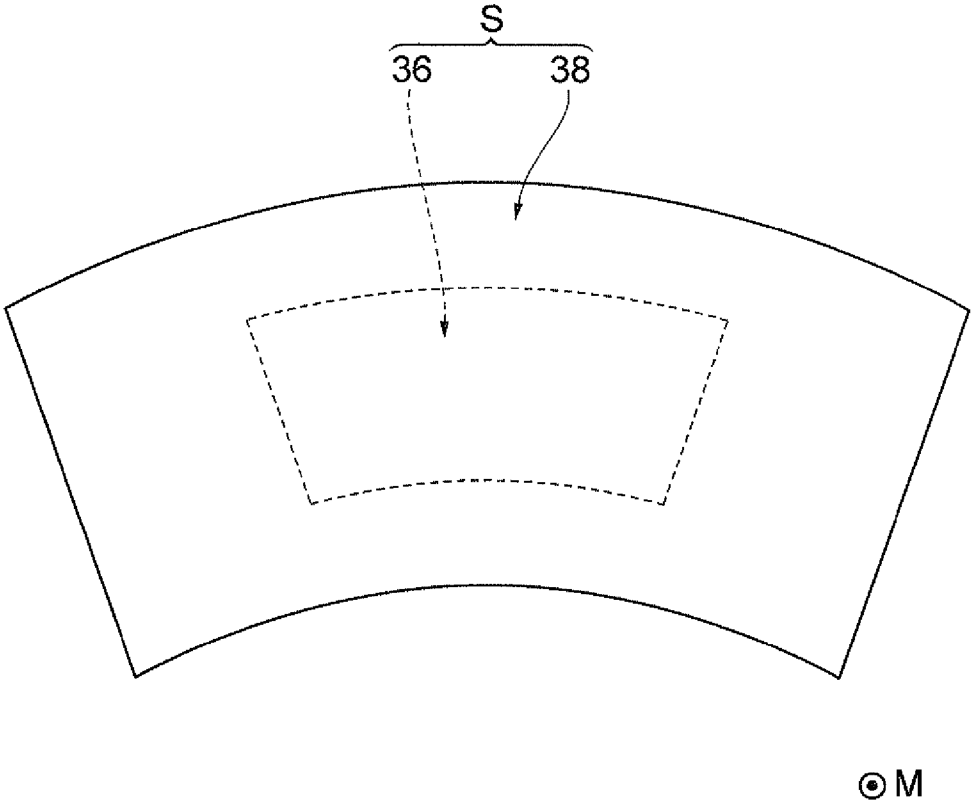
FIG. 3 is a schematic diagram illustrating a surface to which the easy magnetization direction of the magnet base body is a perpendicular in surfaces of the magnet member in accordance with the embodiment of the present invention.

As illustrated in FIGS. 1 to 3, the magnet member 30 in accordance with this embodiment comprises a magnet base body 32 and a plating film 34 covering all the surfaces of the magnet base body 32. The magnet base body 32 is a fan-shaped plate. However, the form of the magnet base body 32 is not limited to the fan shape. The magnet base body 32 has a typical size on the order of 4 to 50 mm (L)×5 to 100 mm (W)×0.5 to 10 mm (T) regardless of its shape. The average thickness of the plating film 34 may be on the order of 1 to 30 μm.

The magnet base body 32 is constituted by an R-T-B-based rare-earth magnet (rare-earth permanent magnet). The R-T-B-based rare-earth magnet contains a rare-earth element R, a transition metal element T, and boron B. The rare-earth element R may be at least one kind selected from the group consisting of La, Ce, Pr, Nd, Pm, Sm, Eu, Gd, Tb, Dy, Ho, Er, Tm, Yb, and Lu. Preferably, in particular, the rare-earth magnet contains both Nd and Pr as the rare-earth element R. Preferably, the rare-earth magnet contains Co and Fe as the transition metal element T. By containing these elements, the rare-earth magnet can remarkably improve its residual magnetic flux density and coercive force. The rare-earth magnet may further contain other elements such as Mn, Nb, Zr, Ti, W, Mo, V, Ga, Zn, Si, Cu, Al, and Bi when necessary.

The plating film 34 is constituted by elemental Ni or an Ni alloy. The plating film 34 functions as a protective film for preventing the magnet base body 32 from corroding.

A fan-shaped surface S of the magnet member 30 has an easy magnetization direction M of the magnet base body 32 as a perpendicular thereto. In other words, the surface S of the magnet member 30 has a normal direction parallel to the easy magnetization direction M of the magnet base body 32. The surface S may be either flat or curved. When a perpendicular at a point (e.g., center of gravity) within the curved surface S is parallel to the easy magnetization direction M, the surface is regarded as a surface having the easy magnetization direction M as a perpendicular thereto.

The sulfur content $[S]_M$ in the plating film 34 in a marginal part 38 of the surface S is lower than the sulfur content $[S]_C$ in the plating film 34 in a center part 36 of the surface S. Here, the center part 36 means a region surrounded by the marginal part 38. The center part 36 and marginal part 38 may also be defined as follows. First, the contour of the surface S (figure A) is assumed to be transformed into a similar figure (figure B) by a reduction ratio of 50%. Subsequently, the figure B is overlaid on the figure A such that their centers of gravity coincide with each other while the sides of the figure B are parallel to their corresponding sides of the figure A. Here, the region represented by the figure B is defined as the center part. On the other hand, a region which is on the outside of the figure B but on the inside of the figure A is defined as the marginal part.

Preferably, the sulfur content $[S]_M$ in the plating film 34 in the marginal part 38 is 0.80 to 0.95 times the sulfur content $[S]_C$ in the plating film 34 in the center part 36 (e.g., at the center of gravity of the surface S). This makes it easier to improve the corrosion resistance and adhesion of the magnet member. Here, $[S]_C$ is on the order of 100 to 3000 mass ppm, while $[S]_M$ is on the order of 50 to 2000 mass ppm. The adhesion tends to become better as $[S]_C$ is higher. The adhesion tends to become worse as $[S]_C$ is lower. The corrosion resistance tends to become worse as $[S]_M$ is higher. That is, the corrosion resistance tends to improve as $[S]_M$ is lower. The plating film 34 tends to lose its hardness when $[S]_M$ and $[S]_C$ are too low, e.g., less than 20 mass ppm each. This may make the plating film 34 easier to be damaged and let thus damaged part cause corrosion. On the other hand, the plating film 34 tends to become fragile when $[S]_M$ and $[S]_C$ are too high, e.g., more than 5000 mass ppm each. This may generate fractures in the plating film 34 and let thus fractured parts cause corrosion. However, the present invention can exhibit its advantageous effects even when $[S]_M$ and $[S]_C$ are outside of their ranges mentioned above. The sulfur content in the plating film 34 may gradually increase from the marginal part 38 of the surface S toward the center of gravity.

Preferably, the plating film 34 is formed by electroplating. In the plating film 34 formed by electroplating, the sulfur content tends to become lower in the marginal part 38 than in the center part 36 of the surface S. Preferably, the plating film 34 is thicker in the marginal part 38 than in the center part 36. In other words, it is preferred for the marginal part 38 to project more than the center part 36 in the easy magnetization direction M, so that the surface S has a concave form. When the surface S is concave, it becomes easier to enhance the bonding strength between the surface S and a metal component such as a yoke. When the plating film 34 is formed by electroplating, a concave surface can be produced. When the surface S is concave, the thickness of the plating film 34 in the marginal part 38 may be on the order of 2 to 50 μm. When the surface S is concave, the thickness of the plating film 34 in the center part 36 may be on the order of 1 to 30 μm.

Adhesion

Figure 4:
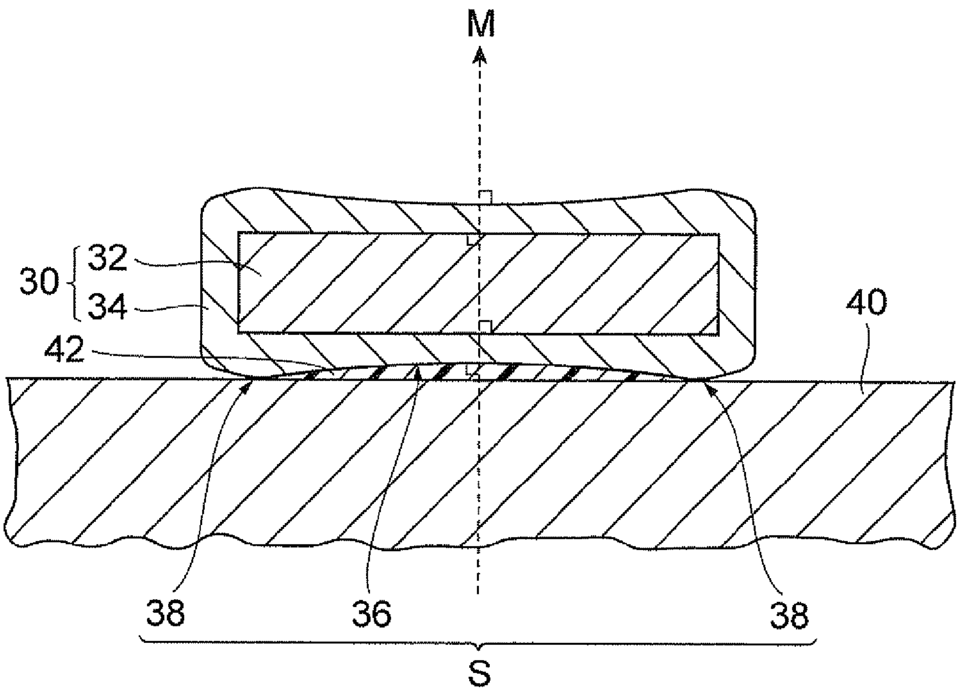
FIG. 4 is a schematic diagram illustrating a state in which the magnet member in accordance with the embodiment of the present invention is bonded to a surface of a yoke for a voice coil motor.

The magnet member 30 in accordance with this embodiment is suitable as a magnet for a motor such as a voice coil motor (VCM). The magnet member 30 is incorporated in the motor, so as to form a magnetic circuit. As illustrated in FIG. 4, the magnet member 30 incorporated in the motor is secured to a surface of a yoke 40, which is mainly constituted by a silicon steel plate, with an adhesive 42 interposed therebetween. In general, the magnet member 30 forming the magnetic circuit is secured to the yoke such that the surface S having its easy magnetization direction M opposes the yoke surface. It is necessary for the yoke and the magnet member 30 to be firmly bonded together in order to respond to higher-speed rotations of the motor.

When the plating film 34 made of Ni or an Ni alloy is formed on the surface of the magnet base body 32 by electroplating, the current density tends to become higher in the marginal part than in the center part (near the center of gravity) of the magnet base body 32 during the electroplating in general. As a result, the plating film 34 tends to become thicker in the marginal part 38 than in the center part 36 of the surface S of the magnet member 30 completed. That is, on the surface S of the magnet member 30 formed with the plating film 34, the center part 36 tends to be depressed slightly as compared with the marginal part 38. Sufficient bonding strength is exhibited when the adhesive 42 filling the depressed part of the surface S and the yoke surface are brought into surface contact with each other.

Functional groups such as hydroxyl and sulfone groups are more likely to appear in the surface S of the plating film 34 as the sulfur content is higher in the plating film 34. These functional groups act on the adhesive 42, thereby influencing the adhesion between the surface S and the yoke surface. The adhesion between the surface S of the magnet member and the yoke surface is more likely to improve in a part having a greater number of the above-mentioned functional groups in the surface S. In this embodiment, the sulfur content $[S]_M$ in the plating film 34 in the marginal part 38 of the surface S is lower than the sulfur content $[S]_C$ in the plating film 34 in the center part 36 of the surface S. Therefore, the center part 36 is bonded and secured to the yoke surface more firmly than the marginal part 38. The inventors think that the bonding strength thus varies between the center part 36 and marginal part 38 in the surface S of the magnet member 30, so that the center part 36 is bonded more firmly to the yoke than the marginal part 38, whereby a stress relaxation effect occurs at the interface between the plating film 34 and the adhesive 42, which yields sufficient adhesion force between the whole surface S and the yoke surface. In particular, the inventors consider that the functional groups in the plating film surface strongly influence the adhesion under a highly humid environment, thereby remarkably exhibiting the stress relaxation effect. However, factors for improvement in the adhesion between the magnet member 30 and yoke 40 in the present invention are not necessarily limited to those mentioned above.

Corrosion Resistance

The plating film 34 formed by electroplating relatively projects in the marginal part 38 of the surface S. The projected plating film 34 (the marginal part 38 of the surface S) comes into line contact with the yoke surface. Hence, the marginal part 38 of the surface S contributes less to improving the bonding strength than the center part 36. Applying an adhesive in excess to the surface S so as to interpose it by a sufficient amount between the marginal part 38 of the surface S and the yoke may improve the adhesion therebetween. However, the use of the adhesive in excess should be avoided in order to suppress the manufacturing cost of the magnet member 30. Therefore, the adhesive 42 is harder to travel around to enter between the projected marginal part 38 and the yoke, thereby making it easier for the projected marginal part 38 to come into direct contact with the yoke (silicon steel plate). The plating film 34 made of Ni or an Ni alloy and the yoke 40 (silicon steel plate), each made of a metal, may generate a contact potential difference when coming into direct contact with each other, thereby letting their contact part serve as a start point for corrosion. In particular, when a motor is used under a highly humid environment, dew or a water film adhering to the contact part between the marginal part 38 and yoke 40 may form a local cell because of the contact potential difference therebetween, thereby making the corrosion easier to proceed in the contact part.

As the sulfur content is lower in the plating film 34, the corrosion potential of the plating film 34 itself shifts more to the noble side, thereby improving the corrosion resistance of the plating film 34 itself. In this embodiment, the sulfur content $[S]_M$ in the plating film 34 in the marginal part 38 is lower than the sulfur content $[S]_C$ in the plating film 34 in the center part 36. That is, the plating film 34 has the low sulfur content $[S]_M$ in the marginal part 38 that may come into direct contact with the yoke and form the local cell. This causes the plating film 34 to shift the corrosion potential in the marginal part 38 to the noble side. The inventors think that the corrosion resistance of the magnet member 30 as a whole including the marginal part 38 improves as a result. This embodiment achieves sufficient corrosion resistance by the plating film 34 alone unlike conventional magnet members which form a separate protective film such as a chromate coating film on an Ni plating film. However, factors for improvement in corrosion resistance of the magnet member in the present invention are not necessarily limited to those mentioned above.

Method of Manufacturing Magnet Member

A method of manufacturing the above-mentioned magnet member 30 will now be explained.

Step of Making the Magnet Base Body

First, the magnet base body 32 to be arranged within the magnet member 30 is made. When making the magnet base body 32, a material alloy is cast initially, so as to yield an ingot. As the material alloy, one containing a rare-earth element R, a transition metal T, and B may be used. The material alloy may further contain other elements such as Mn, Nb, Zr, Ti, W, Mo, V, Ga, Zn, Si, Cu, Al, and Bi when necessary. The chemical composition of the ingot may be adjusted according to that of the main face of the rare-earth magnet to be obtained finally.

Subsequently, the ingot is roughly pulverized by a disk mill or the like, so as to yield an alloy powder having a particle size on the order of 10 to 100 μm. The alloy powder is finely pulverized by a jet mill or the like, so as to yield an alloy powder having a particle size on the order of 0.5 to 5 μm, which is then molded under pressure in a magnetic field into a shaped body. In this pressure molding step, the direction of the magnetic field in which the alloy powder is placed substantially coincides with the easy magnetization direction of the shaped body. The easy magnetization direction of the shaped body substantially coincides with the easy magnetization direction M of its sintered body (magnet base body).

The strength of the magnetic field applied to the alloy powder during the pressure molding is preferably 800 kA/m or higher. The pressure applied to the alloy powder during the molding is preferably on the order of 10 to 500 MPa. Either a uniaxial pressing method or an isostatic pressing method such as CIP may be used as the molding method. Thereafter, the resulting shaped body is fired, so as to yield a sintered body (magnet base body).

The firing is preferably performed in a vacuum or an atmosphere of an inert gas such Ar, while the firing temperature may be on the order of 1000 to 1200° C. The firing time may be on the order of 0.1 to 100 hr. The firing step may be carried out a plurality of times.

Preferably, the sintered body (magnet base body) is subjected to aging. Preferably, in the aging, the sintered body is heat-treated in an inert gas atmosphere for about 0.1 to 100 hr at a temperature on the order of 450 to 950° C. Such aging further improves the coercive force of the rare-earth magnet. The aging may be constituted by a multistage heat treatment step. In the aging constituted by two stages of heat treatment, for example, the sintered body may be heated for 0.1 to 50 hr at a temperature of at least 700° C. but lower than its firing temperature in the first stage of the heat treatment and then for 0.1 to 100 hr at 450 to 700° C. in the second stage of the heat treatment.

The sintered body (magnet base body) may be machined into a predetermined form when necessary. Examples of machining include form machining processes such as cutting and shaving and chamfering processes such as barrel polishing. Such machining is not always necessary. When performing the machining, the magnet base body is machined into a predetermined form such that at least one surface of the magnet base body has the easy magnetization direction M as a perpendicular thereto. The surface having the easy magnetization direction M as a perpendicular thereto may be either flat or curved.

The sintered body (magnet base body) may be washed as appropriate in order to eliminate irregularities on the surface or impurities and the like attached thereto. Preferred examples of washing methods include degreasing and acid washing (etching) with acid solutions. The acid washing is easier to yield the magnet base body with a smooth surface by dissolving away irregularities and impurities on the magnet base body.

After washing the acid-washed magnet base body with water so as to remove the processing liquid used for the acid washing, it is preferred for the magnet base body to be washed with ultrasonic waves in order to completely eliminate small amounts of undissolved matters and residual acid components remaining on the surface of the magnet base body. The ultrasonic washing may be performed in deionized water in which the amount of chlorine ions apt to rust the surface of the magnet base body is very small or in an alkaline solution, for example. When necessary, the magnet base body may be washed with water after the ultrasonic washing. The degreasing liquid used in the degreasing is not limited in particular as long as it is used for typical steels. The degreasing liquid is mainly composed of NaOH in general with other additives which are not specified.

The acid used in the acid washing is preferably nitric acid which is an oxidizing acid less likely to generate hydrogen. The nitric acid concentration in the processing liquid is preferably 1 N or less, 0.5 N or less in particular.

When typical steel materials are subjected to plating, non-oxidizing acids such as hydrochloric acid and sulfuric acid are often used. When a material containing a rare-earth element is treated with a non-oxidizing acid, however, hydrogen generated by the acid may be occluded into the surface of the magnet base body, so that the occluded part becomes fragile, thereby generating a large amount of powdery undissolved matters. Since the powdery undissolved matters cause surface roughening after the surface processing, defects, and poor adhesion, it is preferred for the acid washing (etching) liquid to be free of the above-mentioned non-oxidizing acids.

The amount of dissolution in the surface of the magnet base body by such acid washing is preferably at least 5 μm, more preferably 10 to 15 μm, in terms of the average thickness from the surface. This can substantially completely eliminate denatured and oxidized layers formed by the surface processing of the magnet base body.

Preferably, thus preprocessed magnet base body is washed with ultrasonic waves in order to completely eliminate small amounts of undissolved matters and residual acid components from the surface thereof. Preferably, the ultrasonic washing is performed in ion-exchanged water in which the amount of chlorine ions apt to rust the surface of the magnet base body is very small. Similar water washing may be carried out anytime before and after the ultrasonic washing and during the above-mentioned preprocessing.

Through the foregoing step, this embodiment forms the magnet base body 32 including a fan-shaped surface Ss having the easy magnetization direction M as a perpendicular thereto. The surface Ss of the magnet base body 32 corresponds to the surface S of the completed magnet member.

Plating Step

In the plating step, the plating film 34 (protective layer) made of Ni or Ni alloy plating is formed on the surface of the magnet base body 32. The plating film 34 may be formed by sputtering or vapor deposition. When the plating film 34 is a wet-type plating film, it can be formed by typical electroplating (electric plating) or electroless plating. Specifically, the plating film 34 can be formed by Ni electroplating or Ni electroless plating.

In the Ni electroplating, a plating bath is prepared, and the magnet base body 32 is dipped into a plating liquid by using a barrel or grabbing jig. Then, electricity is applied between the magnet base body 32 electrically connected to a cathode and an anode, whereby the plating film 34 can be formed on the surface of the magnet base body 32. Examples of the plating liquid (plating bath) usable for Ni electroplating include Watts baths, sulfamate baths, borofluoride baths, and Ni bromide baths. Each of the plating baths contains a sulfur compound. Sulfur derived from the sulfur compound contained in the plating bath is introduced into the plating film 34. Usable as the sulfur compound is at least one kind of sulfonates such as 1,3,6-naphthalenetrisulfonate, 1,5-naphthalenedisulfonate, 1,6-naphthalenedisulfonate, 2,5-naphthalenedisulfonate, allyl sulfonate, and benzene sulfonate; aromatic sulfonimides such as saccharin and sodium saccharin; sulfonamides such as p-toluene sulfonamide and benzene sulfonamide; sulfinates such as sulfinic acid and benzene sulfinate; compounds having a thiourea group such as thiosulfates, sulfites, thiourea, thiosemicarbazide, and methylthiosemicarbazide; and salts, derivatives, derivative salts, and the like of these organic compounds. The sulfur compound content in the plating liquid may be adjusted as appropriate according to desirable $[S]_M$ and $[S]_C$.

In the Ni electroless plating, the magnet base body 32 may be dipped in a nickel chemical plating liquid (at a temperature of about 80° C.) containing a predetermined amount of nickel ions and, for example, a reducing agent such as sodium hypophosphite, a complexing agent such as sodium citrate, and ammonium sulfate, so as to form the plating film 34 on the surface of the magnet base body 32. Each of the plating baths contains the above-mentioned sulfur compound.

Preferably, this embodiment forms the plating film 34 by electroplating (Ni electroplating). As will be explained in the following, the use of electroplating makes it easier to form the concave surface S in which the marginal part 38 projects more than the center part 36 in the easy magnetization direction M. The use of electroplating can also adjust the sulfur content $[S]_M$ in the plating film 34 in the marginal part 38 of the surface S to a value lower than the sulfur content $[S]_C$ in the plating film 34 in the center part 36 of the surface S. Specific examples of the electroplating method include the following rack plating method and barrel plating method.

When forming the plating film 34 by electroplating, the marginal part of the magnet base body 32 (the marginal part of the surface Ss) tends to incur higher current density, since electric fields concentrate there from many directions. By contrast, a part surrounded by the marginal part tends to have lower current density, since electric fields are applied there only in the vertical direction. Hence, by using this relationship of current density, the thickness of the plating film 34 in the resulting magnet member 30 can be made thicker in the marginal part 38 than in the center part 36.

In the rack plating method, the magnet base body 32 to be plated is directly held by a cathode terminal in the plating liquid. Then, the surface Ss of the magnet base body 32 is opposed to an anode and energized, so as to perform plating. Appropriately setting the distance and positional relationship between the magnet base body 32 and the anode and arranging a shielding plate and a sacrificial cathode can control a plating current density distribution on the magnet base body 32 and, accordingly, a thickness distribution of the plating film 34.

In the barrel plating method, plating is performed in a state where a cathode terminal is inserted into a plating barrel containing a mixture of magnetic base bodies 32 and electrically conductive media, while the plating barrel is opposed to an anode in the plating liquid. Appropriately combining the form/number of magnetic base bodies 32 with the form/number of electrically conductive media allows the electrically conductive media to function as a sacrificial cathode. This can control the plating current density distribution on the magnet base body 32 and, accordingly, the thickness distribution of the plating film 34 formed on the surface Ss of the magnet base body 32.

As in the foregoing, the concentration of the sulfur compound in the plating liquid, the current density, the orientation of the surface Ss of the magnet base body 32 with respect to the anode, the distance between the surface Ss and the anode, the positions of the shielding plate and sacrificial cathode between the surface Ss and anode, and the like are appropriately regulated in the electroplating. This can adjust the thickness of the plating film 34 in the marginal part 38, the thickness of the plating film 34 in the center part 36, the sulfur content $[S]_M$ in the plating film 34 in the marginal part 38, and the sulfur content $[S]_C$ in the plating film 34 in the center part 36 to their desirable values. Combining the rack or barrel plating method with the plating liquid having a specific composition suitable therefor can also regulate the thickness and sulfur contents $[S]_M$ and $[S]_C$ in the plating film 34 in the marginal part 38 and center part 36.

Other films may be formed between the magnet base body 32 and the plating film 34. That is, the magnet base body 32 may be covered with the plating film 34 after forming the other films on the surface of the magnet base body 32. The other films can improve the adhesion between the magnet base body 32 and the plating film 34. Examples of the other films include those containing at least one kind of metal selected from the group consisting of Al, Sc, Ti, V, Cr, Mn, Fe, Co, Ni, Cu, and Zn or alloys having the metal. Such films may be formed by a known technique such as sputtering, vapor deposition, electroplating, or electroless plating.

Though the magnet member in accordance with this embodiment and a method of manufacturing the same have been explained in the foregoing, the present invention is not limited to the above-mentioned embodiment at all.

The form of the magnet member is not limited to the fan shape. Examples of the magnet member whose surface S having the easy magnetization direction M as a perpendicular thereto is a flat surface include substantially rectangular parallelepiped members and substantially disk-shaped members in addition to the fan-shaped ones. The substantially rectangular parallelepiped members have a substantially oblong surface S. The substantially disk-shaped members have a substantially circular surface S.

Examples of the magnet member whose surface S having the easy magnetization direction M as a perpendicular thereto is a curved surface include substantially cylindrical members and substantially crescent members. In a substantially cylindrical member, a side face of its cylinder corresponds to the surface S. The easy magnetization direction M of the cylindrical member extends radially from the long axis of the member toward the side face, so as to intersect the surface S orthogonally. A substantially crescent member of the magnet base body has a curved oblong surface S.

When the surface S having the easy magnetization direction M as a perpendicular thereto is a curved surface, the curved surface is developed into a flat surface. The center and marginal parts can be defined in the flat surface by a method similar to that mentioned above.

When the surface S having the easy magnetization direction M as a perpendicular thereto is a round curved surface such as a side face of a cylindrical tube or column, the curved surface is developed into a flat surface A. The flat surface A is similarly transformed by a reduction ratio of 50% only in a direction orthogonal to the circumferential direction of the round surface S, so as to construct a flat surface B. The center and marginal parts can be defined in the flat surface B by a method similar to that mentioned above.

The magnet member whose surface S having the easy magnetization direction M as a perpendicular thereto is a flat surface can be used for permanent magnet synchronous motors (IPM motors), linear synchronous motors, and voice coil motors, for example. Such a motor is equipped with a yoke having a flat surface in general. The magnet member of the present invention is bonded and secured to the flat surface of the yoke.

The magnet member whose surface S having the easy magnetization direction M as a perpendicular thereto is a curved surface can be used for permanent magnet synchronous motors (SPM motors) and vibrating motors, for example. Such a motor is equipped with a yoke having a curved surface in general. The magnet member of the present invention is bonded and secured to the curved surface of the yoke.

The form of the magnet member of the present invention and the kind of motors using the magnet member are not limited to those mentioned above.

The present invention will now be explained more specifically with reference to examples and comparative examples, but will not be limited to the following examples at all.

Example 1

Step of Making a Magnet Base Body

An ingot having a composition of 27.4 mass % Nd, 3 mass % of Dy, 1 mass % of B, and 68.6 mass % of Fe was produced by powder metallurgy. The ingot was pulverized by a stamp mill and a ball mill, so as to yield a fine alloy powder having the above-mentioned composition.

The fine alloy powder was press-molded in a magnetic field, so as to yield a shaped body. The shaped body was sintered in an Ar gas atmosphere at a holding temperature of 1100° C. for a holding time of 1 hr and then aged in an Ar gas atmosphere at a holding temperature of 600° C. for a holding time of 2 hr, so as to yield a sintered body.

The resulting sintered body was machined into a rectangular parallelepiped having a size of 30 mm×60 mm×5 mm and then chamfered by barrel polishing, so as to yield a magnet base body. Here, the sintered body was machined such that the easy magnetization direction M of the magnet base body was a perpendicular to a surface (surface Ss) having a size of 30 mm×60 mm.

Preprocessing Step

The magnet base body was subjected to preprocessing which performed alkali degreasing, washing with water, acid washing with a nitric acid solution, washing with water, desmutting by ultrasonic washing, and washing with water in sequence.

Plating Step

A plating bath (liquid type: S0) having the following composition was prepared. The pH and temperature of the plating bath were adjusted to 4.0 and 50° C., respectively.

The composition of S0: 270 g/L of nickel sulfate hexahydrate, 50 g/L of nickel chloride hexahydrate, 45 g/L of boric acid, 5 g/L of sodium saccharin, and 0.3 g/L of coumarin.

The preprocessed magnet base body was dipped into the plating bath S0 and subjected to electroplating by the barrel plating method. The electroplating was performed with an average current density Dk adjusted to 0.3 A/dm$^2$ until a plating film having a thickness of about 5 μm was formed on all the surfaces of the magnet base body. The foregoing steps yielded the magnet member of Example 1.

Measurement of $[S]_M$ and $[S]_C$

The sulfur content $[S]_M$ (unit: mass ppm) in the plating film in the marginal part of the surface S having the easy magnetization direction M of the magnet base body as a perpendicular thereto and the sulfur content $[S]_C$ (unit: mass ppm) in the plating film in the center part (at the center of gravity) of the surface S were measured by a fluorescent X-ray analysis. In the fluorescent X-ray analysis, the diameter of a collimator was set to 1 mm. Here, the surface S of the magnet member is a surface corresponding to the surface Ss (the surface having a size of 30 mm×60 mm) of the magnet base body. The respective perpendiculars to the surfaces Ss and S of the magnet base body and magnet member are parallel to the easy magnetization direction M of the magnet base body.

Attaching to a Yoke

An adhesive was applied by 0.008 to 0.010 g to the surface S of the magnet member. The surface S having the adhesive applied thereto was attached to the yoke, and the magnet member was pressed against the yoke, so as to form a pressure-bonded body. As the yoke, a silicon steel plate (material: SPCC; size: 80 mm (L)×80 mm (W)×1 mm (T)) was used. As the adhesive, an anaerobic acrylic adhesive (LOCTITE 638 UV manufactured by Loctite Japan, Co., Ltd.) was used.

After being held for 30 min in a dryer preheated to 100° C., the pressure-bonded body was subjected to the following compression shear tests 1 and 2 and moisture resistance test.

Compression Shear Test 1

The pressure-bonded body was subjected to a compression shear test at a rate of 5 mm/min at room temperature.

Moisture Resistance Test

The pressure-bonded body was held for 1000 hr under a high-temperature, high-humidity environment at 85° C., 90% RH, and changes in the appearance about the magnet member bonded to the yoke were observed.

Compression Shear Test 2

After being held for 1000 hr in the same high-temperature, high-humidity environment as in the moisture resistance test, the pressure-bonded body was subjected to a compression shear test at a rate of 5 mm/min at room temperature.

Examples 2 to 7 and Comparative Examples 1 to 4

When making the magnet members of Examples 2 to 7 and Comparative Examples 1 to 4, their corresponding plating methods and plating baths listed in Table 1 were used for performing their plating steps. In the plating steps of the magnet members of Examples 2 to 7 and Comparative Examples 1 to 4, the current density Dk and the pH of plating baths were adjusted to the values listed in Table 1. The magnet members and pressure-bonded bodies of Examples 2 to 7 and Comparative Examples 1 to 4 were made as in Example 1 except for the items mentioned above. The following are the compositions of the plating baths (liquid types S1 to S4) listed in Table 1. Each plating bath employed water as its solvent.

The composition of S1: 200 g/L of nickel sulfate hexahydrate, 70 g/L of nickel chloride hexahydrate, 45 g/L of boric acid, 3 g/L of sodium saccharin, and 0.3 g/L of coumarin.

The composition of S2: 150 g/L of nickel sulfate hexahydrate, 100 g/L of nickel chloride hexahydrate, 45 g/L of boric acid, 2 g/L of sodium 1,3,6-naphthalenetrisulfonate, and 0.1 g/L of 1,4-butyne-2-diol.

The composition of S3: 300 g/L of nickel sulfamate tetrahydrate, 30 g/L of nickel chloride hexahydrate, 30 g/L of boric acid, and 1 g/L of sodium saccharin.

The composition of S4: 200 g/L of nickel sulfamate tetrahydrate, 50 g/L of nickel chloride hexahydrate, 30 g/L of boric acid, and 1 g/L of sodium 1,5-naphthalenedisulfonate.

In Table 1, “Moisture resistance” represents the result of evaluation of the moisture resistance test. “A” means that there was no change in the appearance about the magnet member. “B” means that there was a change in color about the magnet member. The magnet member of a pressure-bonded body evaluated A is superior to the magnet member of a pressure-bonded body evaluated B in terms of the corrosion resistance in the marginal part of the surface S.

In Table 1, “Bonding strength durability” represents the result of evaluation of the compression shear test 2. The reduction in compression shear strength under the high-temperature, high-humidity environment was determined by subtracting the compression shear strength measured in the compression shear test 2 from the compression shear strength measured in the compression shear test 1. “A” means that the reduction in compression shear strength was 1 MPa or less. “B” means that the reduction in compression shear strength was more than 1 MPa but less than 2 MPa. “C” means that the reduction in compression shear strength was 2 MPa or more. The durability of the bonding strength of the magnet member to the yoke under the high-temperature, high-humidity environment is better as the reduction in compression shear strength is smaller.

In Table 1, “A” in “Total” means that all of the evaluations of “Initial adhesion,” “Moisture resistance,” and “Bonding strength durability” were A. “B” in “Total” means that at least one of the evaluations was “B,” but none of them was “C.” “C” in “Total” means that at least one of the evaluations was “C.”

TABLE 1

| | Plating bath | | | Plating | | | | | Initial | Moisture | Bonding strength | |
|---|---|---|---|---|---|---|---|---|---|---|---|---|
| | Type | pH | Dk | method | $[S]_C$ | $[S]_M$ | Diff | $[S]_M/[S]_C$ | adhesion | resistance | durability | Total |
| Example 1 | S0 | 4.0 | 0.3 | barrel | 1800 | 1650 | 8.3% | 0.92 | A | B | B | B |
| Example 2 | S1 | 4.0 | 2.0 | rack | 1100 | 930 | 15.5% | 0.85 | A | A | A | A |
| Example 3 | S2 | 4.5 | 0.2 | barrel | 800 | 750 | 6.3% | 0.94 | A | A | B | B |
| Example 4 | S2 | 4.5 | 0.3 | barrel | 780 | 690 | 11.5% | 0.88 | A | A | A | A |
| Example 5 | S3 | 4.0 | 1.0 | rack | 450 | 370 | 17.8% | 0.82 | A | A | A | A |
| Example 6 | S3 | 4.5 | 0.5 | rack | 390 | 370 | 5.1% | 0.95 | A | A | B | B |
| Example 7 | S4 | 4.0 | 0.3 | barrel | 300 | 280 | 6.7% | 0.93 | B | A | B | B |
| Comparative Example 1 | S1 | 4.5 | 0.1 | barrel | 1100 | 1100 | 0.0% | 1.00 | A | A | C | C |
| Comparative Example 2 | S2 | 4.0 | 2.0 | rack | 800 | 820 | −2.5% | 1.03 | A | A | C | C |
| Comparative Example 3 | S3 | 4.5 | 0.1 | barrel | 500 | 500 | 0.0% | 1.00 | A | A | C | C |
| Comparative Example 4 | S4 | 4.5 | 0.1 | barrel | 300 | 300 | 0.0% | 1.00 | B | A | C | C |

The measurement of $[S]_M$ and $[S]_C$, compression shear tests 1 and 2, and moisture resistance test were performed in each of the magnet members of Examples 2 to 7 and Comparative Examples 1 to 4 as in Example 1. Table 1 lists $[S]_M$, $[S]_C$, and results of compression shear tests 1 and 2 and moisture resistance test for each of the examples and comparative examples. In each of the examples and comparative examples, $[S]_M$ was substantially constant anywhere in the marginal part.

In Table 1, “Diff” represents $[([S]_C-[S]_M)/[S]_C]\times 100$.

In Table 1, “Initial adhesion” represents the result of evaluation of the compression shear test 1. “A” means that the compression shear strength measured in the compression shear test 1 was 5 MPa or higher. “B” means that the compression shear strength was at least 4 MPa but less than 5 MPa. The compression shear strength of the pressure-bonded body is a pressure required for peeling the magnet member off the yoke. The initial adhesion of the magnet member to the yoke is better as the compression shear strength measured in the compression shear test 1 is higher.

REFERENCE SIGNS LIST

30 . . . magnet member; 32 . . . magnet base body; 34 . . . plating film; 36 . . . center part; 38 . . . marginal part; 40 . . . yoke; 42 . . . adhesive; M . . . easy magnetization direction of the magnet base body; S . . . surface of the magnet member having the easy magnetization direction of the magnet base body as a perpendicular thereto; Ss . . . surface of the magnet base body having the easy magnetization direction as a perpendicular thereto

What is claimed is:

1. A magnet member comprising:

a magnet base body including a rare-earth magnet; and a plating film containing Ni that covers the magnet base body and forms an outermost layer of the magnet member, the plating film containing Ni comprising (i) a center part that coincides with a center of the magnet base body, and (ii) a marginal part;

wherein the plating film containing Ni has a sulfur content lower in the marginal part of the outermost layer of the magnet member than in the center part of the outermost layer of the magnet member, wherein a surface of the plating film containing Ni that forms the outermost layer of the magnet member is perpendicular to an easy magnetization direction of the magnet base body, and wherein the center part of the plating film containing Ni is surrounded by the marginal part of the plating film containing Ni, the center part having a 50% reduction ratio relative to the marginal part, wherein the plating film containing Ni is thicker in the marginal part than in the center part.

2. A magnet member according to claim 1, wherein the sulfur content in the plating film in the marginal part is 0.80 to 0.95 times that in the center part.

3. A magnet member according to claim 1, wherein the plating film containing Ni is formed by electroplating.

4. A magnet member according to claim 2, wherein the plating film containing Ni is formed by electroplating.

5. A magnet member according to claim 1, wherein the plating film containing Ni that forms the outermost layer of the magnet member comprises an outermost surface having a concave form.

* * * * *